United States Patent
Qin et al.

(10) Patent No.: US 7,550,226 B2
(45) Date of Patent: Jun. 23, 2009

(54) BATTERY COVER ASSEMBLY FOR PORTABLE ELECTRONIC DEVICE

(75) Inventors: Shui-Yuan Qin, Shenzhen (CN);
An-Ming Feng, Shenzhen (CN);
Chia-Hua Chen, Tucheng (TW);
Hsiao-Hua Tu, Tucheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 434 days.

(21) Appl. No.: 11/307,686

(22) Filed: Feb. 17, 2006

(65) Prior Publication Data

US 2006/0192525 A1 Aug. 31, 2006

(30) Foreign Application Priority Data

Feb. 25, 2005 (CN) .................... 2005 1 0333369

(51) Int. Cl.
*H01M 2/10* (2006.01)
*E05C 3/14* (2006.01)

(52) U.S. Cl. .................. 429/100; 429/96; 429/97; 429/98; 429/99; 292/228; 292/299

(58) Field of Classification Search .............. None
See application file for complete search history.

(56) References Cited

U.S. PATENT DOCUMENTS 4,712,898 A * 12/1987 Haraguchi .............. 396/539
5,468,158 A * 11/1995 Roebuck et al. ........... 439/264
5,955,700 A * 9/1999 Slipy et al. ................ 174/50
2006/0141344 A1* 6/2006 Chen et al. ................ 429/97

FOREIGN PATENT DOCUMENTS

JP 05-198154 A * 8/1993
JP 2001053847 * 2/2001

OTHER PUBLICATIONS

JPO machine translation of JP 05-198154 A published on Aug. 6, 1993, retrieved on Sep. 11, 2008.*

* cited by examiner

*Primary Examiner*—Dah-Wei D Yuan
*Assistant Examiner*—Katherine Turner
(74) *Attorney, Agent, or Firm*—Steven M. Reiss

(57) ABSTRACT

A battery cover assembly (100) includes a battery cover (30), a resilient member (20), and a locking member (40). The battery cover has a latching member configured for engaging with the fastener mechanism of a housing (10), and an insertion hole (322) configured for the insertion of a latching post (120) of the housing. The resilient member is mounted on the battery cover, and has a first latching end (202) and a second latching end (204). The first latching end is secured on the battery cover. The locking member is rotatably attached on the battery cover and configured for resisting the latching post when the battery cover is in the closed position thereby preventing movement of the battery cover toward the opened position. The second latching end of the resilient member is fixed on the locking member.

20 Claims, 8 Drawing Sheets

BATTERY COVER ASSEMBLY FOR PORTABLE ELECTRONIC DEVICE

FIELD OF THE INVENTION

The present invention generally relates to battery cover assemblies and, more particularly, to a battery cover assembly for use in a portable electronic device.

DESCRIPTION OF RELATED ART

Batteries are widely used in portable electronic devices, such as personal digital assistants (PDAs), mobile phones and so on. Conventional batteries are attachably received in the electronic device, and battery covers are designed to connect with housings of the electronic devices to package the batteries. The batteries have to be replaced by opening the battery covers when the batteries are, e.g., damaged, dead, and/or in need of recharging or replacement.

A clasp structure or latch structure is used with a conventional battery cover to engage with a housing of a portable electronic device. For example, a mobile phone marked Alcatel OT310 has a latch for the battery cover. The latch includes a pair of hooks at one end of the battery cover and a locking pin protruding from the other end of the battery cover. Accordingly, a pair of grooves is defined in an end portion of a backside of a housing of the mobile phone, and a locking hole is defined in the other end portion of the backside of the housing. In assembly, the hooks are firstly inserted into the grooves in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, great effort is needed to disassemble the battery cover, thereby requiring a substantial force to be exerted thereon. Therefore, the battery cover is susceptible to damage. As a result, it is inconvenient for a user to replace a battery in the conventional housing of the mobile phone.

Referring to FIG. 8, this shows another fixing mechanism, which is used to fix a battery 104' onto a back side of a cellphone housing 102'. The fixing mechanism includes a hook 106', a spring 108', and a slot 112'. The hook 106' includes an operating portion 114', an accepting portion 116', and a protrusion 110'. The hook 106' is movably assembled to the back side of the cellphone housing 102'. The spring 108' is disposed around the accepting portion 116', and lies between the cellphone housing 102' and the hook 106'. The slot 112' is defined in the battery 104'. The protrusion 110' is located in the slot 112' to fix the battery 104'. When the battery 104' needs to be installed into the cellphone housing 102', the battery 104' is pressed into the cellphone housing 102'. The hook 106' is caused to move lengthwise in a first direction along the cellphone housing 102', and the spring 108' is compressed. Eventually, the hook 106' reaches the slot 112'. The spring 108' rebounds, and the hook 106' moves lengthwise in an opposite second direction along the cellphone housing 102'. Thus the protrusion 110' snappingly engages in the slot 112', and the battery 104' is firmly fixed in the cellphone housing 102'. When the battery 104' needs to released from the cellphone housing 102', the operating portion 114' is pressed in the first direction. Then the spring 108' is compressed, and the hook 106' disengages from the slot 112'. The battery 104' can then be readily released. However, the fixing mechanism uses up extra space in the cellphone housing 102'. The needed extra space may result in the cellphone being unduly large.

What is needed, therefore, is a new battery cover assembly for a portable electronic device which makes it convenient for a user to detach a battery cover from a housing of a portable electronic device.

SUMMARY OF INVENTION

A battery cover assembly for a portable electronic device is provided, which is convenient for a user to operate and which is durable.

In one embodiment thereof, a battery cover assembly for a portable electronic device having a housing, the housing having a cavity, and a fastener mechanism, and a latching post, the battery cover moveable into a closed position for covering the cavity into an opened position for exposing the cavity, the battery cover assembly includes a battery cover, a resilient member and a locking member. The battery cover includes a battery cover having a latching member configured for engaging with the fastener mechanism of the housing, and an insertion hole configured for the insertion of the latching post of the housing. The resilient member is mounted on the battery cover, and has a first latching end and a second latching end. The first latching end is secured on the battery cover. The locking member is rotatably attached on the battery cover and configured for resisting the latching post when the battery cover is in the closed position thereby preventing movement of the battery cover toward the opened position. The second latching end of the resilient member is fixed on the locking member.

Other advantages and novel features will become more apparent from the following detailed description when taken in conjunction with the accompanying drawing.

BRIEF DESCRIPTION OF DRAWINGS

Many aspects of the battery cover assembly can be better understood with reference to the following drawings. The components in the drawings are not necessarily to scale, the emphasis instead being placed upon clearly illustrating the principles of the present battery cover assembly. Moreover, in the drawings, like reference numerals designate corresponding parts throughout the several views.

DETAILED DESCRIPTION

The present battery cover assembly is suitable for portable electronic devices such as mobile phones, PDAs, and so on.

Figure 1:
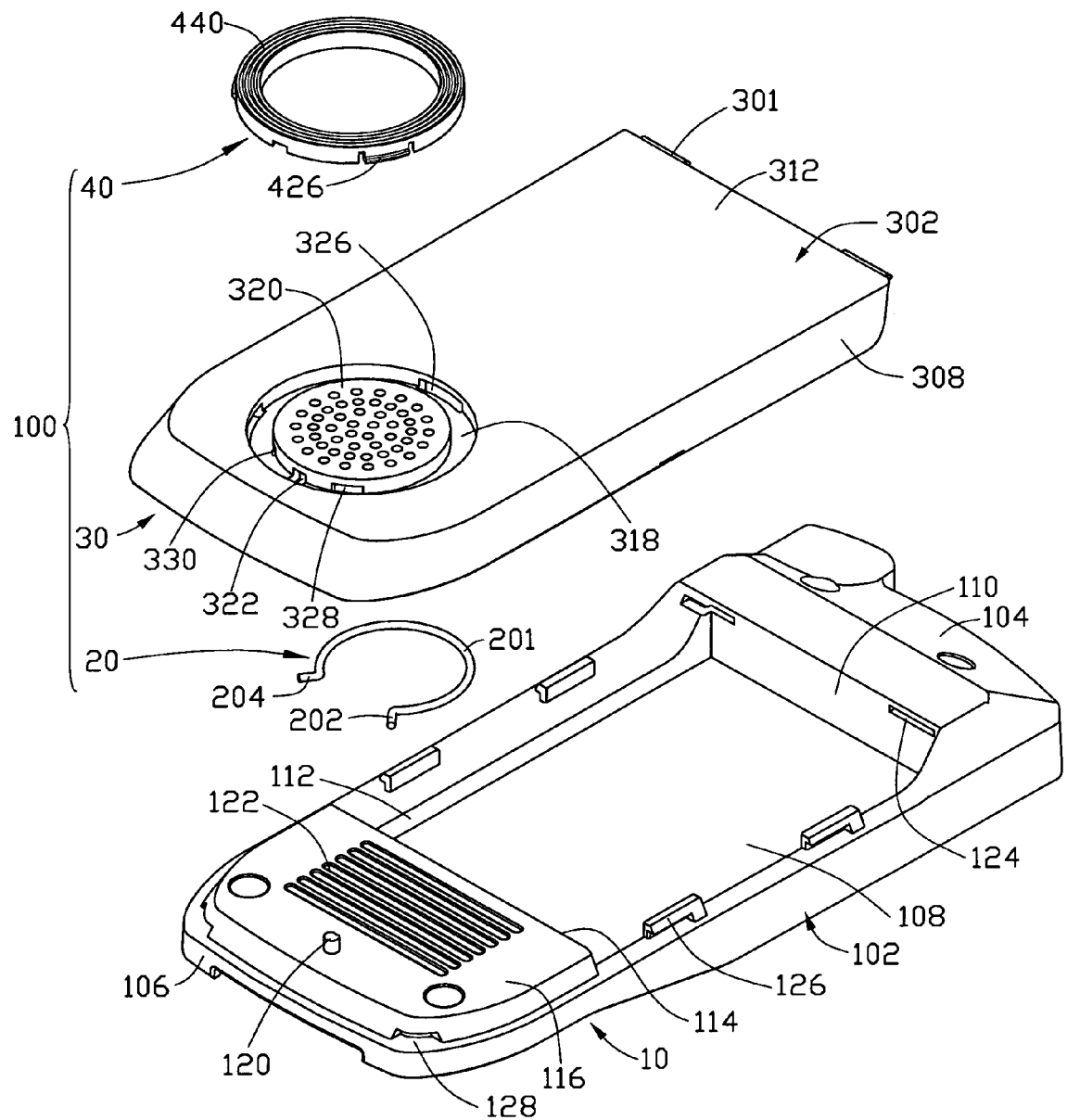
FIG. 1 is an exploded, isometric view of a battery cover assembly in accordance with a preferred embodiment, together with a housing of a mobile phone.
Figure 2:
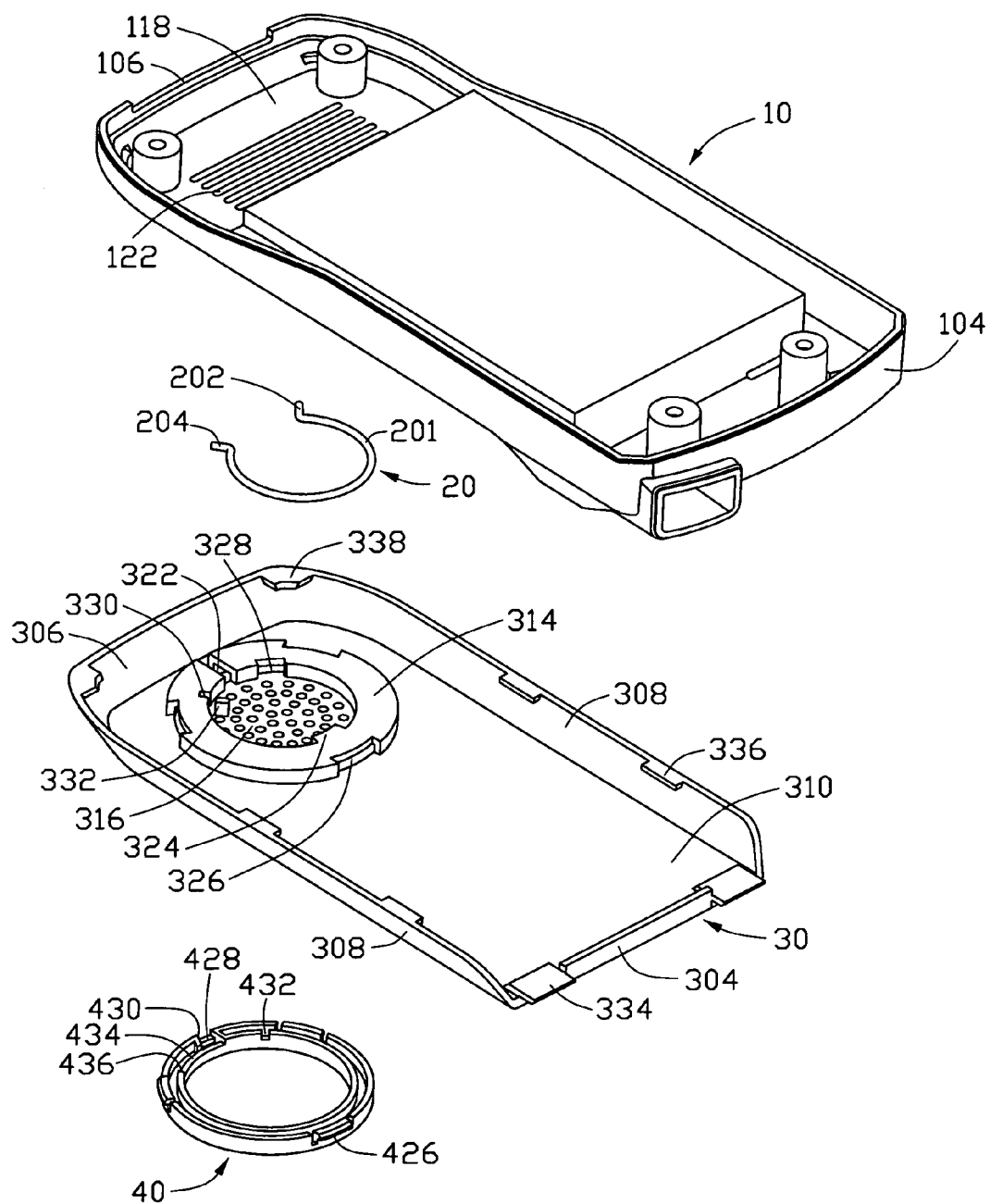
FIG. 2 is similar to FIG. 1, but viewed from another aspect.
Figure 5:
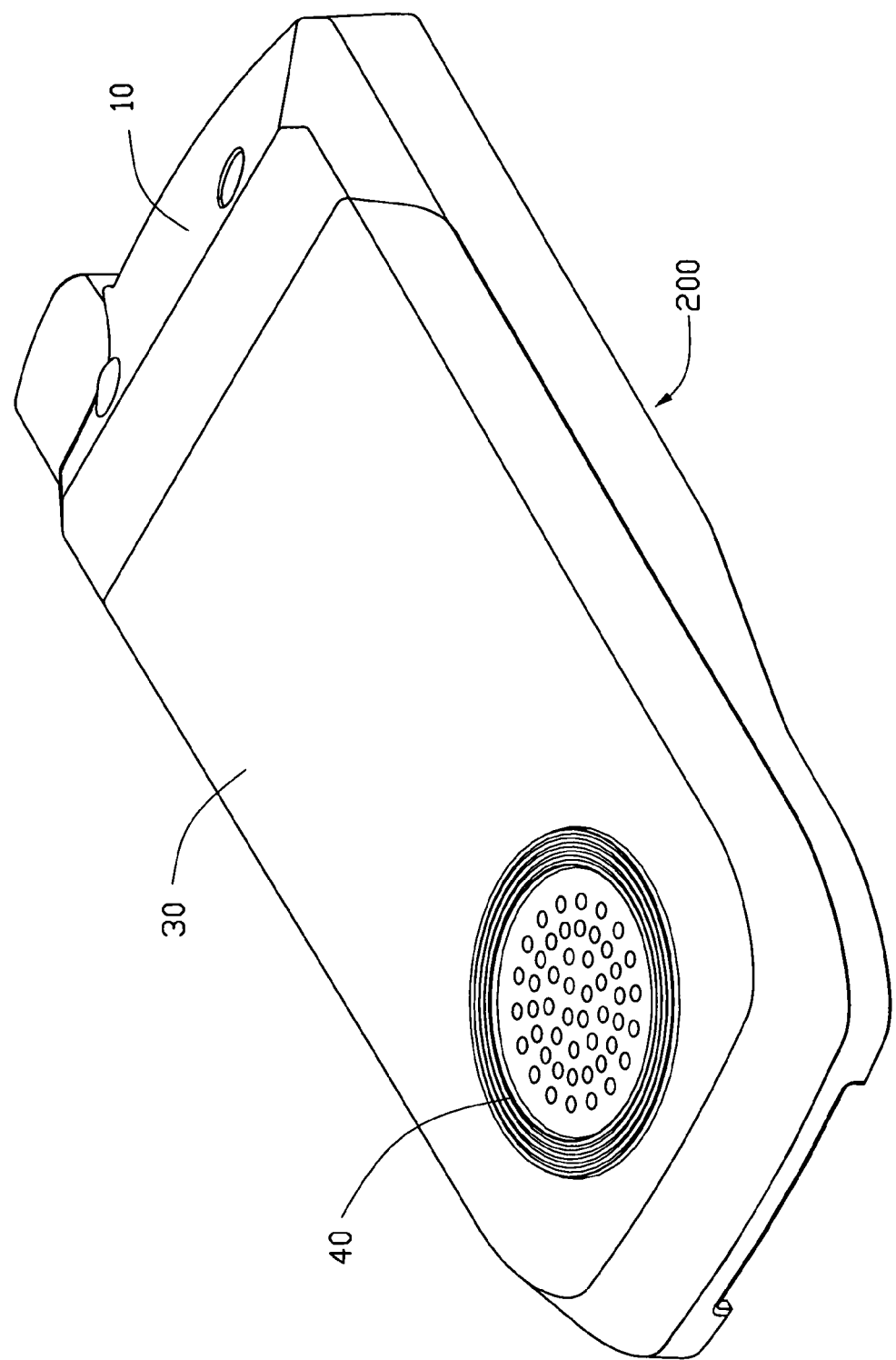
FIG. 5 is an enlarged, assembled, isometric view of the battery cover assembly shown in FIG. 1.

Referring to FIG. 1 and FIG. 2, a battery cover assembly 100 for use in a portable electronic device (e.g., a mobile phone) 200 (as best shown in FIG. 5) will be taken here as an example to disclose details according to a preferred embodiment of the present invention. The mobile phone 200 includes a housing 10 and the battery cover assembly 100. The battery cover assembly 100 includes a resilient member 20, a battery cover 30 and a locking member 40.

The housing 10 is a portion of the mobile phone 200 for accommodating an electronic module (not shown), such as a printed circuit board, therein. This accommodation occurs when the housing 10 is assembled with other elements (not shown) of the mobile phone 200. The housing 10 includes a main body 102 with a front end 104 and a rear end 106. The main body 102 defines a substantially rectangular cavity 108 adjoining/proximate the front end 104, thereby forming a front wall 110 adjacent the front end 104, two opposite sidewalls 112 and a real wall 114 on the main body 102. The cavity 108 is used and thereby configured to receive a battery (not illustrated). The main body 102 includes an outer surface 116 facing the battery cover 30, and an opposite inner surface 118. A latching post 120 protrudes from the outer surface 116 of the main body 102 adjoining the rear end 106. A plurality of slits 122 is defined in the main body 102 between the cavity 108 and the latching post 120. A fastener mechanism (not labelled) is disposed on the main body 102. The fastener mechanism includes a pair of catch slots 124 defined in the front wall 110, a pair of latching hooks 126 disposed on each of opposite sidewalls 112, and a pair of latch slots 128 defined in the rear end 106 of the main body 102.

The resilient member 20 is substantially Ω-shaped. The resilient member 20 has a main body 201 in the shape of circular with an gap (not labelled), and has a first latching end 202 and a second latching end 204 by bending two ends of the main body 200 outward at the gap.

The battery cover 30 is moveable between a closed position for covering the cavity 108 of the housing 10 and an opened position for exposing the cavity 108 of the housing 10. The battery cover 30 includes a main body 302, a top wall 304, a bottom wall 306, and two opposite sidewalls 308. The main body 302 includes an inner surface 310, which together with the top wall 304, the bottom wall 306, and the two opposite sidewalls 308 defines a substantially rectangular space (not labelled). The main body 302 includes an outer surface 312 opposite to the inner surface 310 thereof. An annular protrusion 314 extends from a middle bottom portion of the inner surface 310 of main body 302, near the bottom wall 306, thereby forming a receiving groove 316. The annular protrusion 314 is, conversely, recessed from the outer surface 312 of the main body 302 to form an annular groove or indent 318, thereby forming a circular stage 320 at the outer surface 312. The circular stage 320 defines a plurality of transmitter holes (not labelled). The transmitter holes and the slits 122 of the housing 10 corresponds to a transmitter disposed in the housing 10. The annular protrusion 314 defines an insertion hole 322 adjacent the middle portion of the bottom wall 306, corresponding to the latching post 120 of the housing 10. The annular protrusion 314 has a locking block 324 extending from an inner peripheral wall thereof inward into receiving groove 316. The locking block 324 is opposite to the insertion hole 322. The annular protrusion 314 has three spaced latching cutouts 326 evenly defined in an outer peripheral wall thereof. A notch 328 and a latching opening 330 are defined in the inner peripheral wall of the annular protrusion 314, and are respectively disposed two sides of the insertion hole 322. The notch 328 and the latching opening 330 respectively communicate with the annular groove 318. A stop block 332 protrudes out of the bottom of the receiving groove 316, adjacent the latching opening 330. A distance is defined between the stop block 332 and the inner peripheral wall of the annular protrusion 314. The resilient member 20 is received in the receiving groove 316. The resilient member 20 tightly resists against the inner peripheral wall of the annular protrusion 314, and is locked in the battery cover 30 by spring force itself, the stop block 332 and the locking block 324. The first latching end 202 extends into the annular groove 318 via the notch 328, and can move in the notch 328. The second latching end 204 of the resilient member 20 is locked in the latching opening 330, and extends out of the latching opening 330.

The battery cover 30 has a latching member (not labelled) engaging with the fastener mechanism of the housing 10. The latching member includes a pair of catches 334, a pair of hooks 336 and two latches 338. The catches 334 extend from the top wall 304 adjacent the opposite wall 308, corresponding to the catch slots 124 of the housing 10. The hooks 336 extend from edge of the two opposite walls 308 of the housing 10 toward the inner surface 312 of the battery cover 10, corresponding to the latching hooks 126 of the housing 10. The latches 338 extend from bottom wall 306, corresponding to the latch slots 128 of the housing 10.

Figure 3:
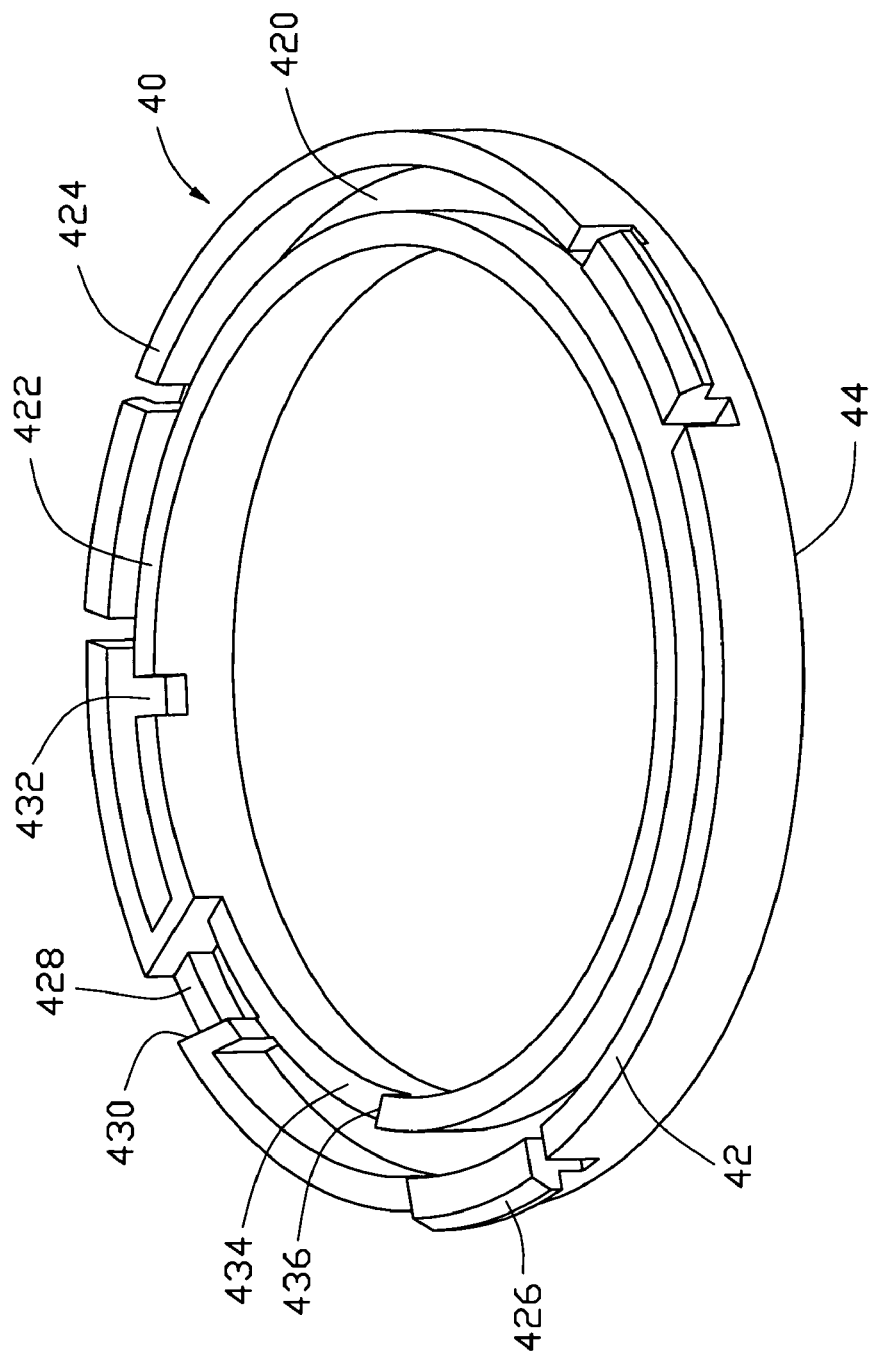
FIG. 3 is an enlarged, isometric view of a locking member of the battery cover assembly shown in FIG. 1.

Referring to FIG. 1 to FIG. 3, the locking member 40 is annular shape, and has a first end surface 42, and a second end surface 44. The locking member 40 defines an annular slot 420 in the first end surface 42, thereby forming an inner ring portion 422 and an outer ring portion 424. The second end surface 44 defines a plurality of annular slits 440 to increase friction coefficient, for facilitating operation of the locking member 40. Three evenly-spaced latching tabs 426 extend from the outer ring portion 424 outward, for engaging in latching cutouts 326 of the battery cover 30. The size of the latching tabs 426 is less than that of the latching cutout 326 of the battery cover 30, thus the latching tabs 426 can move in the latching cutout 326 along peripheral direction. The locking member 40 defines an opening 428 communicating with the annular slot 420 in the first end surface 42, and an inclined plane 430 is formed on the locking member 40 adjacent the opening 428. The inner ring portion 422 defines a retaining opening 432 disposed at one side of the opening 428, and a peripheral opening 434 communicating with the opening 428. A step 436 is formed at one side of the peripheral opening 434 away from the opening 428.

Figure 4:
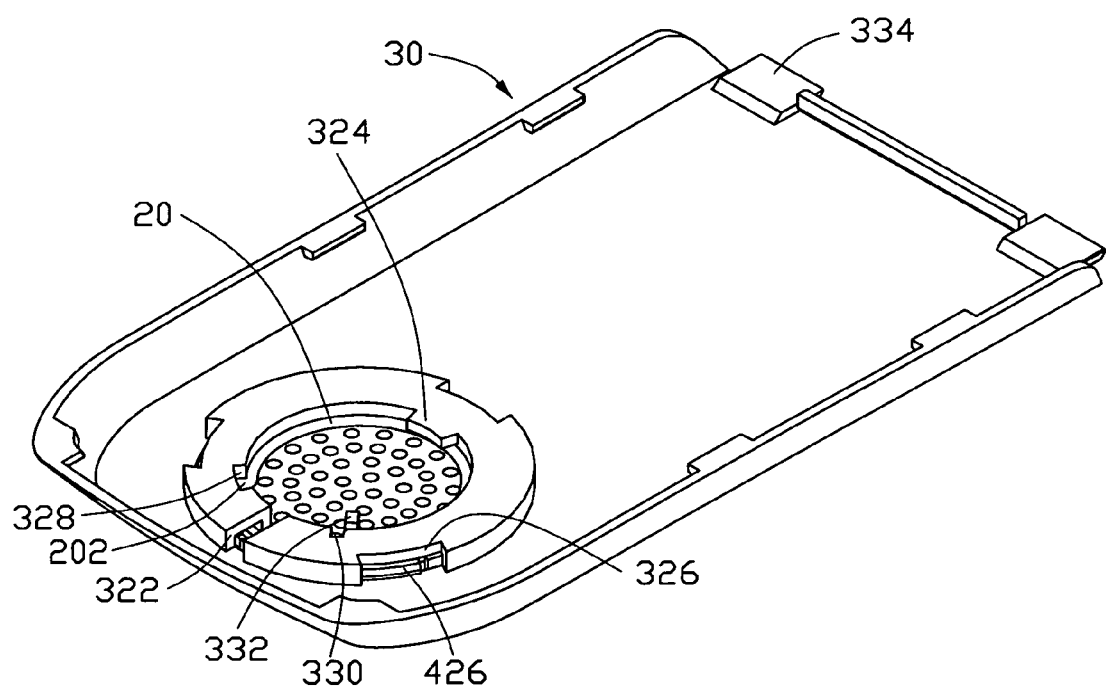
FIG. 4 is an assembled view of the battery cover assembly shown in FIG. 1.

In assembly, referring now to FIG. 4, firstly, the resilient member 20 is received in the receiving groove 316. Because the diameter of the resilient member 20 is larger than the inner diameter of the annular protrusion 314, the resilient member 20 is thereby twisted and accumulates a predetermined spring force. The resilient member 20 tightly resists against the inner peripheral wall of the annular protrusion 314, and restricted in the battery cover 30 by spring force itself, the stop block 332 and the locking block 324. The first latching end 202 extends into the annular groove 318 via the notch 328, and can move in the notch 328. The second latching end 204 of the resilient member 20 is locked in the latching opening 330. Secondly, the locking member 40 is received in the annular groove 318 of the battery cover 30, with the three latching tabs 426 respectively engaging in a respective latching cutout 326 and the circular stage 320 exposing out of the locking member 40. The first latching end 202 of the resilient member 20 is fixed in the retaining opening 432, the second latching end 204 freely rests against the step 436 of the battery cover 30. At this state, the opening 428 slightly offsets from the insertion hole 322 of the battery cover 30.

Figure 6:
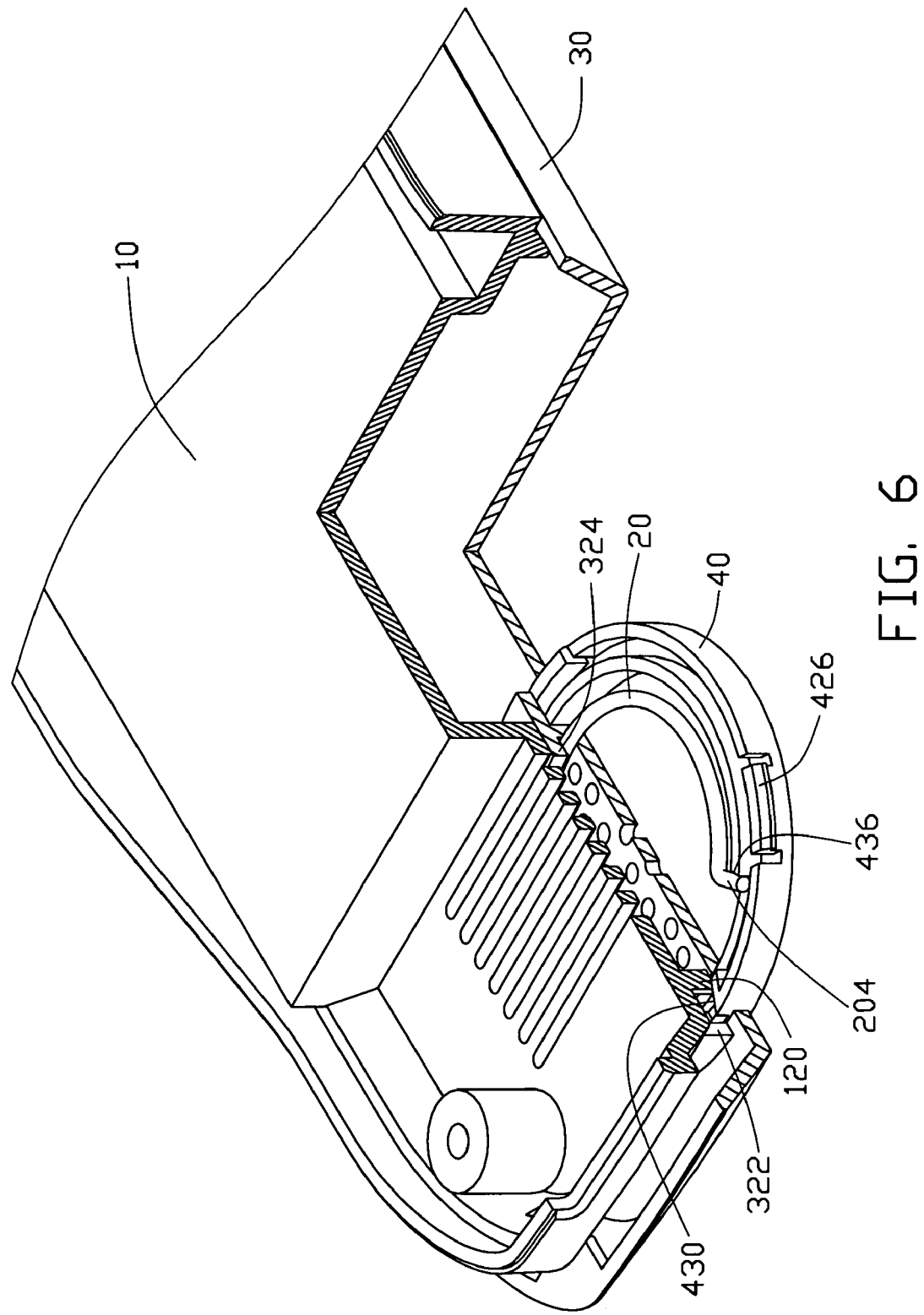
FIG. 6 is an assembled process, cut-away view of FIG. 2.
Figure 7:
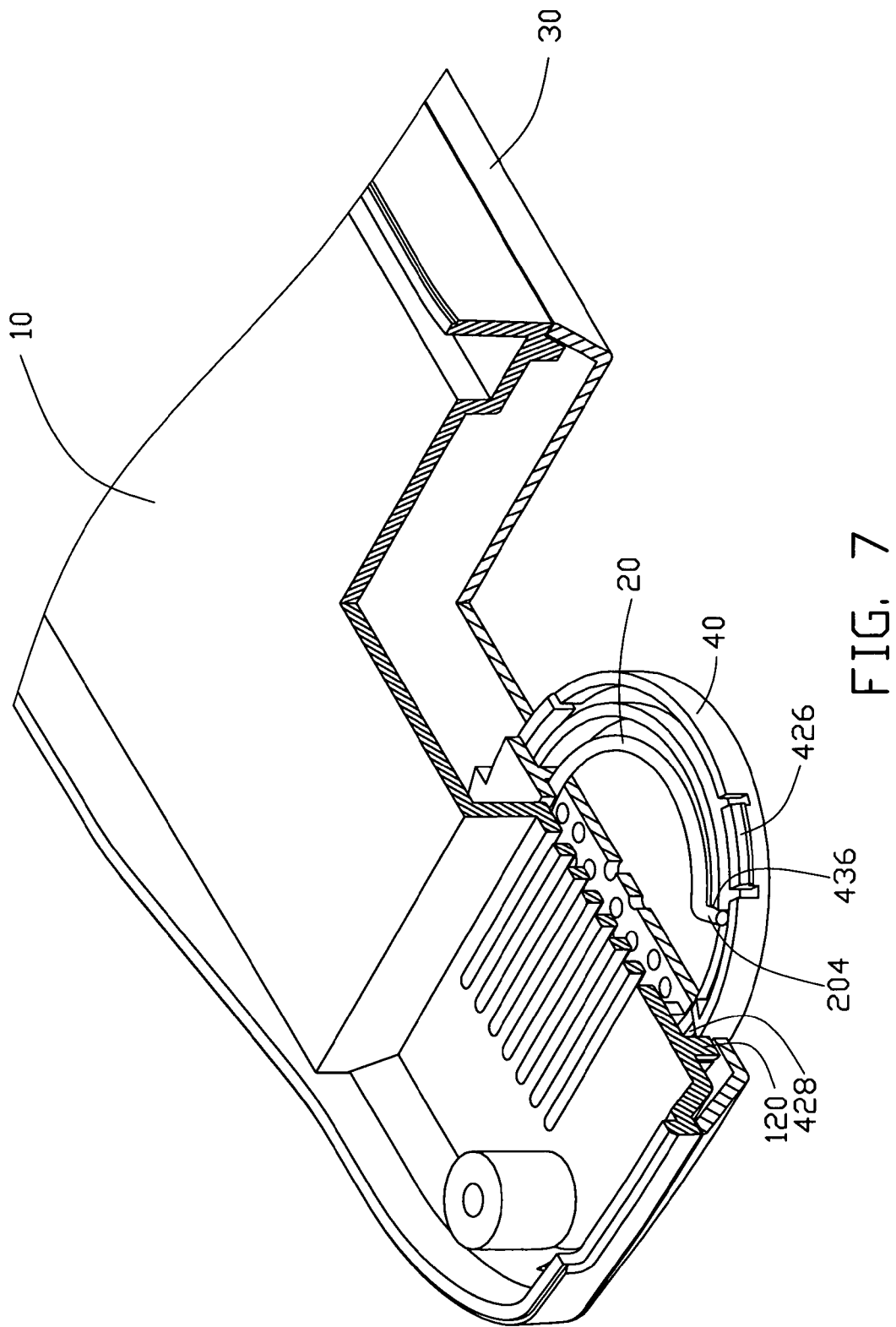
FIG. 7 is similar to FIG. 6, but shown the battery cover attached to the housing.
Figure 8:
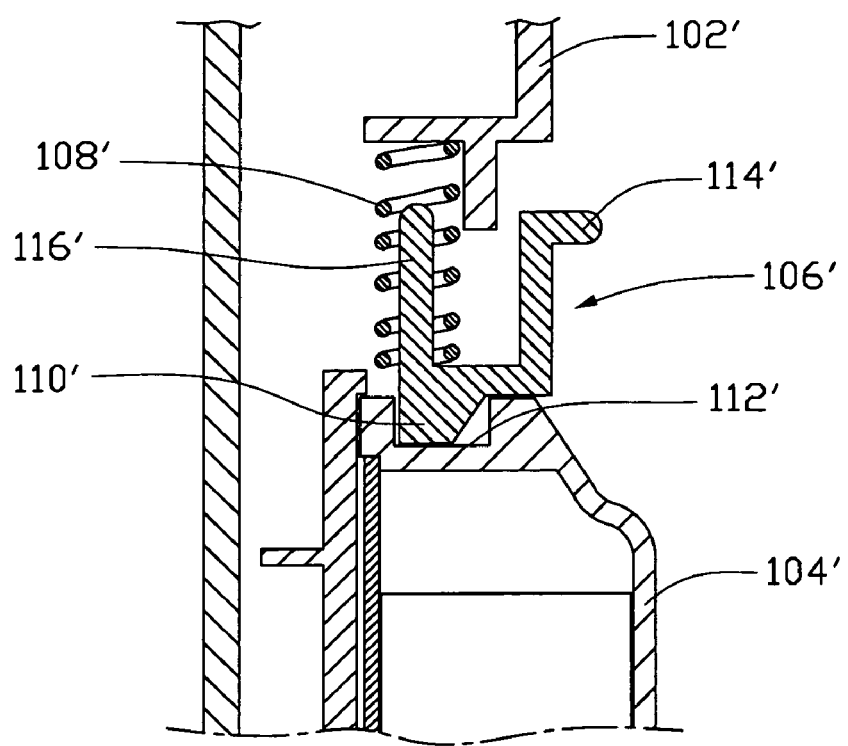
FIG. 8 is a cross-sectional view of a conventional battery cover assembly, together with part of a battery.

Referring also to FIG. 5 and FIG. 6, thirdly, the combined battery cover 30 is attached to the housing 10 via the rear end 106 of the housing 10 as follows. The combined battery cover 30 is pushed from the rear end 106 of the housing 10 toward the front end 104 of the housing 10. Because the opening 428 of the locking member 40 slightly offsets from the latching post 120 of the housing 10, the inclined plane 430 moves tangentially to the latching post 120, which makes the locking member 40 rotate counter-clockwise as shown FIG. 6. Thus, the resilient member 20 is compressed and accumulates spring force. When the battery cover 30 moves a predetermined distance, and the locking member 40 rotates a predetermined angle, the latching post 120 of the housing 10 retracts from the opening 428 of the locking member 40. The compressed resilient member 20 forces the locking member 40 to rotate to an original state. The latching post 120 resists against the outer peripheral wall of the locking member 40, with the catches 334, the hooks 336 and the latches 338 of the battery cover 30 respectively inserted into the catch slots 124, the latching hooks 12, and the latch slots 128 of the housing 10. The combined battery cover 30 is thus removably attached to the housing 10, as shown in FIG. 7.

When the battery cover 30 is detached from the housing 30, the locking member 40 is rotated counter-clockwise, as shown in FIG. 4., the first latching end 202 of the resilient member 20 rotates along with the locking member 40, which makes the resilient member 20 compressed. When the latching post 120 of the housing 10 aligns with the opening 428 of the locking member 40, the battery cover 30 is pushed toward the rear end 106 of the housing 10 to detach the battery cover 30 from the housing 10 by means of a user putting his/her finger annular slits 440 of the locking member 40. Afterwards, die compressed resilient member 20 forces the locking member 40 to rotate to an original state.

In alternative embodiments, two or more latching cutouts 326 of the battery cover 30 could be provided. The number of the latching tabs 426 of the locking member 40 is corresponding to the number of the latching cutouts 326 of the battery cover 30. The resilient member 20 can be seated in the annular groove 318 of the battery cover 30. The first latching end 202 of the resilient member 20 is secured on the battery cover 30, and the second latching end 204 of the resilient member 20 is retained on the locking member 40. The locking member 40 can be other shape, such as round disk.

In alternative embodiment section, it is further realized that the battery cover assembly 100 could be applied to the assembly of two parts other than a battery cover and a housing and that the resulting assembly would be considered to be within the scope of use of the present battery cover assembly 100.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover assembly for a portable electronic device having a housing, the housing having a cavity, and a fastener mechanism, and a latching post, the battery cover moveable between a closed position for covering the cavity and an opened position for exposing the cavity, the battery cover assembly comprising:
a battery cover having a latching member configured for engaging with the fastener mechanism of the housing, the battery cover having an insertion hole configured for the insertion of the latching post of the housing, the battery cover including a main body, a top wall, a bottom wall, and two opposite sidewalls, the main body includes an inner surface and an outer surface opposite to the inner surface, the battery cover having an annular protrusion extending from a middle bottom portion of the main body, near the bottom wall;
a resilient member mounted on the battery cover, the resilient member having a first latching end and a second latching end, the first latching end secured on the battery cover;
a locking member rotatably attached on the battery cover and configured for resisting the latching post when the battery cover is in the closed position thereby preventing movement of the battery cover toward the opened position, the second latching end of the resilient member being fixed on the locking member.

2. The battery cover assembly as claimed in claim 1, wherein the locking member has an opening defined in one end surface, and an inclined plane formed adjacent the opening, the locking member rotates relative to the battery cover and the inclined plane moves tangentially when the battery cover is moved from the opened position to the closed position.

3. The battery cover assembly as claimed in claim 2, wherein the annular protrusion is recessed from the outer surface of the main body to form an annular groove within the outer surface of the battery cover.

4. The battery cover assembly as claimed in claim 3, wherein the annular protrusion has a locking block extending from an inner peripheral wall thereof inward opposite to the insertion hole.

5. The battery cover assembly as claimed in claim 4, wherein a notch and a latching opening are defined in the inner peripheral wall of the annular protrusion, and respectively are disposed two sides of to insertion hole, and communicate with the annular groove.

6. The battery cover assembly as claimed in claim 5, wherein a receiving groove is formed in the annular protrusion, a stop block protrudes out of the bottom of the receiving groove, adjacent the latching opening.

7. The battery cover assembly as claimed in claim 6, wherein the resilient member is received in the receiving groove and tightly resists against the inner peripheral wall of the annular protrusion, and locked in the battery cover by resilient force itself, the stop block and the locking block.

8. The battery cover assembly as claimed in claim 7, wherein the first latching end of the resilient member extends into the annular groove via the notch, the second latching end of the resilient member is locked in the latching opening, and extends out of the latching opening.

9. The battery cover assembly as claimed in claim 3, wherein the annular protrusion has three spaced latching cutouts evenly defined in an outer peripheral wall thereof.

10. The battery cover assembly as claimed in claim 9, wherein the locking member is annular, and has a first end surface, and a second end surface.

11. The battery cover assembly as claimed in claim 10, wherein the locking member defines an annular slot in the first end surface, thereby forming an inner ring portion and an outer ring portion.

12. The battery cover assembly as claimed in claim 11, wherein three even-spaced latching tabs extend from the outer ring portion outward, for engaging in latching cutouts of the battery cover, the size of the latching tab is less than that of the latching cutout.

13. The battery cover assembly as claimed in claim 11, wherein the locking member defines an opening communicating with the annular slot in the first end surface, and an inclined plane is formed on the locking member adjacent the opening.

14. The battery cover assembly as claimed in claim 11, wherein the inner ring portion defines a retaining opening disposed at one side of the opening, and a peripheral opening communicating with the opening, a step is formed at one side of the peripheral opening away from the opening.

15. The battery cover assembly as claimed in claim 14, wherein the first latching end of the resilient member is fixed in the retaining opening, and the second latching end of the resilient member resist against the step.

16. The battery cover assembly as claimed in claim 1, wherein the resilient member is configured for providing a spring force.

17. A portable electronic device comprising:
a housing having a cavity, and a fastener mechanism, and a latching post disposed on one surface thereof;
a battery cover having a latching member engaging with the fastener mechanism of the housing, the battery cover having an insertion hole for the insertion of the latching post of the housing, the battery cover including a main body, a top wall, a bottom wall and two opposite sidewalls, the main body includes an inner surface and an outer surface opposite to the inner surface, the battery cover having an annular protrusion extending from a middle bottom portion of the main body, near the bottom wall;
a resilient member mounted on the battery cover, the resilient member having a first latching end and a second latching end, the first latching end secured on the battery cover;
a locking member rotatably attached on the battery cover, the locking member having an opening defined in one end surface, and an inclined plane formed adjacent the opening;
wherein the second latching end of the resilient member is fixed on the locking member, the locking member rotates relative to the battery cover and the inclined plane moves tangential as the battery cover is moved from the opened position to the closed position.

18. The portable electronic device as claimed in claim 17, wherein the annular protrusion is recessed from the outer surface of the main body to form an annular groove within the outer surface of the battery cover.

19. The portable electronic device as claimed in claim 18, wherein the annular protrusion has three spaced latching cutouts evenly defined in an outer peripheral wall thereof.

20. The portable electronic device as claimed in claim 19, wherein the locking member is annular, and has a first end surface and a second end surface, the locking member defining an annular slot in the first end surface, thereby forming an inner ring portion and an outer ring portion.

* * * * *